United States Patent [19]

Andrews

[11] Patent Number: 5,990,208
[45] Date of Patent: Nov. 23, 1999

[54] STABILIZATION OF POLYCARBONATE/ABS BLENDS WITH MIXTURES OF HINDERED AMINES AND UV ABSORBERS

[75] Inventor: Stephen M. Andrews, New Fairfield, Conn.

[73] Assignee: Ciba Specialty Chemicals Corporation, Tarrytown, N.Y.

[21] Appl. No.: 08/991,044

[22] Filed: Dec. 15, 1997

[51] Int. Cl.$^6$ ..................................................... C08K 5/34
[52] U.S. Cl. ........................... 524/91; 524/100; 524/102; 524/336; 524/337
[58] Field of Search ................... 524/100, 102, 524/91, 336, 337

[56] References Cited

U.S. PATENT DOCUMENTS

| | | |
|---|---|---|
| 3,919,234 | 11/1975 | Ramey et al. . |
| 3,920,659 | 11/1975 | Ramey et al. . |
| 3,928,330 | 12/1975 | Ramey et al. . |
| 4,190,571 | 2/1980 | Lai et al. . |
| 4,240,961 | 12/1980 | Lai . |
| 4,292,240 | 9/1981 | Lai et al. . |
| 4,464,496 | 8/1984 | Nemzek et al. ............... 524/91 |
| 4,480,092 | 10/1984 | Lai et al. . |
| 4,650,870 | 3/1987 | Conetta et al. ............... 544/357 |
| 4,722,806 | 2/1988 | Lai et al. . |
| 4,812,494 | 3/1989 | Nagasaki et al. ............. 524/91 |
| 4,929,653 | 5/1990 | Kletecka et al. . |
| 4,986,932 | 1/1991 | Disteldorf et al. ............ 524/91 |
| 5,059,644 | 10/1991 | Kosinski . |
| 5,071,981 | 12/1991 | Son et al. . |
| 5,096,948 | 3/1992 | Kurumada et al. ........... 524/91 |
| 5,098,944 | 3/1992 | Kletecka et al. . |
| 5,420,181 | 5/1995 | Eichenauer et al. .......... 524/91 |
| 5,492,948 | 2/1996 | Chang et al. ................. 524/100 |
| 5,733,956 | 3/1998 | Lau et al. ..................... 524/91 |
| 5,856,486 | 1/1999 | Pickett et al. ................ 544/385 |
| 5,869,554 | 2/1999 | Pickett et al. ................ 524/100 |

FOREIGN PATENT DOCUMENTS

| | | |
|---|---|---|
| 157734 | 3/1985 | European Pat. Off. . |
| 577292 | 1/1994 | European Pat. Off. . |
| 675159 | 8/1994 | European Pat. Off. . |
| 849327 | 12/1997 | European Pat. Off. . |
| 899295 | 8/1998 | European Pat. Off. . |
| 92-04407 | 3/1992 | WIPO . |

OTHER PUBLICATIONS

Research Disclosure, Oct. 1993/673, Hindered Amine Light Stabilizers For Polycarbonates.
Research Disclosure, Oct. 1993 pp. 673–675.
P. P. Klemchuk, et al. Makromol Chem., Makromol Sympos. 28, 117 (1989).
G. L. Gaines, Jr. Polymer Degradation and Stability, 27, 13(1990).
Additives 95 Meeting, Feb. 22–24, 1995 M. Clauss, et al. Ciba Additives, Basle, Switz.
J. D. Cooney, Polymer Engineering & Science, 22, 492 (1982).
J. L. Gardette, et al. Polymer Degradation and Stability, 48, 457 (1995).

*Primary Examiner*—Veronica P. Hoke
*Attorney, Agent, or Firm*—Luther A. R. Hall

[57] ABSTRACT

Blends of polycarbonate with ABS resins are effectively stabilized by a combination of selected non-basic hindered amines containing the 3,3,5,5-tetramethyl-2-oxo-1-piperazinyl moiety and UV absorbers such as benzotriazoles, s-triazines and benzophenones, particularly the benzotriazoles and s-triazines.

7 Claims, No Drawings

STABILIZATION OF POLYCARBONATE/ABS BLENDS WITH MIXTURES OF HINDERED AMINES AND UV ABSORBERS

Until now, a hindered amine light stabilizer could not be used successfully with polycarbonate or blends of polycarbonate and other polymers. Unexpectedly, it is found that certain hindered amines offer a favorable balance of non-degradative interaction with the polymers while providing favorable efficacy for the retention of impact properties and maintaining low color. This discovery should open the market for polycarbonate containing blends in demanding applications, both for clear and pigmented polymer systems, where retention of physical properties and maintenance of low color are valuable characteristics.

BACKGROUND OF THE INVENTION

There are a myriad of prior art references which teach that polycarbonates alone or in combination with other polymers can be stabilized by conventional stabilizers. However, the only specific disclosure of the stabilization of blends of polycarbonate and the styrenic polymer ABS (acrylonitrile-butadiene-stryene) is by an anonymous author in *Research Disclosure*, October 1993, pp 673–675 where the use of a combination of UV absorber, a hindered amine and other additives is touted. There is no mention that the hindered amine should be non-basic.

Polymer blends provide a valuable balance of mechanical properties, melt processing and cost. Blends have gained wide industrial acceptance as a result. One example is polycarbonate (PC) blended with rubber modified styrenics such as poly(acrylonitrile-butadiene-styrene) (hereafter ABS). The PC provides high mechanical and thermal properties while the ABS allows for a lower processing temperature (than for neat PC) and imparts enhanced low temperature impact strength as seen in the prior art. PC blends are widely used in demanding applications such as automotive parts, power tools, and business equipment housings. In particular, automotive specifications are stringent regarding color retention (lack of discoloration) for PC/ABS and PC/PBT blends. The General Motors Engineering Materials and Processes PLASTICS Standards June 1995, for colored PC/ABS requires a color change test value of delta E equal to 3.0 maximum after 263 kJ/m$^2$ in an interior Xenon Arc apparatus.

However, adequate stabilization of PC blends against terrestrial light remains problematic. The current state of the art is the use of a UV absorber only. A high concentration of such UV absorber is often needed resulting in high cost for such PC blends. While the UV absorber is beneficial in screening UV light, the UV absorber does not act to scavenge radical species which arise from UV induced or thermal induced degradation of the PC or the ABS components in the blends. The hindered amines are well known to be radical scavengers for many classes of polymeric materials such as polyolefins, rubber and styrenic copolymers and terpolymers, including ABS as taught by P. M. Klemchuk et al., Makromol. Chem., Makromol Sympos. 28, 117 (1989).

However, hindered amines cannot be used in polymeric substrates which are sensitive to chemical reaction with the basic nitrogen atom in the hindered amine as taught by G. L. Gaines, Jr. Polymer Degradation and Stability, 27, 13 (1990). Such polymeric substrates include PC and possibly polyesters. Indeed, a severe reduction in mechanical properties is reported when a state-of-the-art hindered amine [bis(2,2,6,6-tetramethyl-piperidin-4-yl) sebacate, TINUVIN® 770, Ciba] is incorporated into a PC/ABS blend as taught by M. Clauss et al.,"Stabilization of PC/ABS blends with a polymer bound hindered amine light stabilizer", Additives 95 meeting, Feb. 22–24, 1995. The PC/ABS blends are susceptible to loss of useful mechanical properties after only a few days of exposure to accelerated weathering conditions. This loss of properties is reported to be due in part to UV induced photooxidation of the polybutadiene portion of the ABS as taught by J. D. Cooney, Polymer Engineering and Science, 22, 492 (1982) and J-L. Gaudette et al., Polymer Degradation and Stability, 48, 457 (1995). While it is known that ABS can be stabilized against terrestrial light by the use of hindered amine or hindered amine in combination with a UV absorber, such hindered amine cannot be used to stabilize the ABS when polycarbonate is present in a multicomponent polymer blend for reasons discussed above. Thus, the PC blends industry is still in need of suitable hindered amines which exhibit no deleterious reaction with the polymers in the blend.

Surprisingly, there is a certain group of hindered amines which appears to be non-interacting in a deleterious manner, and hence suitable for polycarbonate blends. The hindered amines based on 3,3,5,5-tetramethyl-2-piperazinone type structures (GOODRITE® compounds) demonstrate superior efficacy as stabilizers against UV light in PC/ABS blends. These GOODRITE® type hindered amines alone are not sufficient to provide adequate stabilization of the polymer blends against UV light. However, the combination of a UV absorber with these hindered amines does provide adequate stabilization against UV light for such polymer blends. Notably absent in all the prior art is any discussion of the use of combinations of such a hindered amines with a UV absorber to stabilize a polymer or a polymer blend.

U.S. Pat. No. 4,753,979 teaches the use of a 4-acyl-2-piperazinone type compound for stabilization of a range of polymer substrates. U.S. Pat. Nos. 4,240,961; 4,292,240; 4,480,092; 4,722,806; 5,071,981 and 5,098,944; and PCT WO 92/04407 describe the GOODRITE® type hindered amines. These stabilizers are primarily taught as useful in polyolefins, polyacetals (U.S. Pat. No. 5,059,644) and polyglutarimides (EP 577,292). There is no specific teaching that they can or should be used with a UV absorber for stabilizing a polymer or a polymer blend.

DETAILED DESCRIPTION

The instant invention pertains to compositions stabilized against the adverse effects of heat and light which comprise (a) a blend of polycarbonate and a second polymer selected from the group consisting of the polyesters, styrenic copolymers, rubbers and vinyl chloride polymers or copolymers; and (b) an effective stabilizing amount of a mixture of a non-basic hindered amine containing the 3,3,5,5-tetramethyl-2-oxo-1-piperazinyl moiety and a UV absorber.

The second polymer in the blend is selected from the group consisting acrylonitrile-butadiene-stryene (ABS resin), acrylonitrile-styrene-acrylate (ASA resin), acrylonitrile-EPDM-styrene (AES resin), styrene-acrylonitrile (SAN resin), poly(ethylene terephthalate), poly (butylene terephthalate), methyl methacrylate-butadiene-styrene (MBS resin), acrylic rubber, nitrile rubber, polybutadiene, polyisoprene, poly(vinyl chloride) and ABS resin; and poly(vinyl chloride) and ASA resin; preferably ABS resin.

The instant hindered amines of especial uLse in this invention comprise those containing the 3,3,5,5-tetramethyl-2-oxo-1-piperazinyl moiety, in particular the compounds listed below (a) 1,3,5-tris{N-cyclohexyl-N-[2-(3,3,5,5-tetramethylpiperazin-2-on-1-yl)ethyl]amino}-s-triazine (GOODRITE® 3150, Goodrich);

(b) 1,3,5-tris{N-cyclohexyl-N-[2-(3,3,4,5,5-pentaamethylpiperazin-2-on-1-yl)ethyl]amino}-s-triazine (GOODRITE® 3159, Goodrich);

(c) 1,2-bis(3,3,5,5-tetramethylpiperazin-2-on-1-yl)ethane (GOODRITE® 3034, Goodrich);

(d) N-(1,1,3,3-tetramethylbutyl)-3,3,5,5-tetramethyl-2-piperazinone (see U.S. 4,240,961);

(e) 1,3,5-tris{1-methylpropyl[2-(3,3,5,5-tetramethyl-2-oxo-1-piperazinyl)ethyl-amino}-s-triazine;

(f) 1,3,5-tris{1,3-dimethylbutyl[2-(3,3,5,5-tetramethyl-2-oxo-1-piperazinyl)ethyl-amino}-s-triazine;

(g) 1,1',1'',1'''-{1,4-piperazinyl-s-triazin-2,4,6-triyl bis[(isopropylamino)-1,2-ethandiyl]} tetrakis(3,3,5,5-tetramethyl-2-oxo-piperazine);

(h) 1,1',1'',1'''-{1,4-piperazinyl-s-triazin-2,4,6-triyl bis[(cyclohexylamino)-1,2-ethandiyl]} tetrakis(3,3,5,5-tetramethyl-2-oxo-piperazine); or (i) poly{[6-(1-methylpropyl[2-(3,3,5,5-tetramethyl-2-oxo-1-piperazinyl)ethyl]-amino)-s-triazin-2,4-diyl]imino-1,6-hexanediylamino}.

Most especially, the hindered amine is 1,3,5-tris{N-cyclohexyl-N-[2-(3,3,5,5-tetramethylpiperazin-2-on-1-yl)ethyl]amino}-s-triazine (GOODRITE® 3150, Goodrich); or 1,3,5-tris{N-cyclohexyl-N-[2-(3,3,4,5,5-pentaamethylpiperazin-2-on-1-yl)ethyl]amino}-s-triazine (GOODRITE® 3159, Goodrich).

These compounds are reported generically in EP 577,292 and described in U.S. Pat. No. 4,480,092.

While the UV absorbers useful in this application may be benzotriazoles, o-hydroxyphenyl-s-triazines or benzophenones such as 4-octyloxy-2-hydroxy-benzophenone. Certain s-triazines and benzotriazoles are particularly efficacious.

The UV absorbers of particular effectiveness in this invention are 2-(2-hydroxy-3,5-di-α-cumylphenyl)-2H-benzotriazole (TINUVIN® 234, Ciba);

2-(2-hydroxy-5-tert-octylphenyl)-2H-benzotriazole (TINUVIN® 329, Ciba);

2-(2-hydroxy-3-α-cumyl-5-tert-octylphenyl)-2H-benzotriazole (TINUVIN® 928, Ciba); and 2,4-diphenyl-6-(2-hydroxy-4-hexyloxyphenyl)-s-triazine (TINUVIN® 1577, Ciba).

The instant invention teaches using combinations of a UV absorber with GOODRITE® 3150 or GOODRITE® 3159 hindered amine light stabilizer for blends of polycarbonate (PC) and ABS. Several factors appear to allow the Goodrite® hindered amines to exhibit unexpectedly superior stabilization efficacy in contrast to current state-of-the-art hindered amines for these polymer blend applications:

1. GOODRITE® 3150 and GOODRITE® 3159 exhibit a low basicity denoted as pKa value (see Table 1 below). There are other hindered amines which exhibit a pKa value similar to GOODRITE® 3150, but for additional reasons set forth below these other low basicity hindered amines provide inadequate stabilization to a PC/ABS blend.

2. The instant hindered amines of this invention also exhibit a low degree of volatility, and chemical stability for the stabilizer molecule itself, as measured by TGA, at the high processing temperatures needed for the instant polymer blends. Conventional hindered amines are too volatile, or decompose at such processing temperatures precluding them from being effective stabilizers for the instant polymer blends (see Table 1).

3. The hindered amines of this invention also exhibit a minimal or negligible effect on melt viscosity of the polymer blends during processing into final articles (by extrusion or injection molding). Some conventional hindered amines cause chemical degradation of the polycarbonate component during processing, and thus are ineffective in producing a polymer blend of acceptable quality. The deleterious interaction of conventional hindered amine with polycarbonate is known as discussed above.

TABLE 1

| Compound* | Approximate pKa | Temperature at which stated weight loss of additive occurs ° C. | |
|---|---|---|---|
| | | 5% | 10% |
| GOODRITE ® 3150 | 6.7 | 345 | 362 |
| GOODRITE ® 3159 | 6.1 | 2% at 319 | 372 |
| TINUVIN ® 770 | 9.0 | 1% at 200 | 260 |
| TINUVIN ® 622 | 6.5 | 1% at 275 | 335 |
| TINUVIN ® 123 | 4.4 | 222 | 236 |
| HOSTAVIN ® N-30 | 7.4 | 2% at 243 | 330 |

*TINUVIN ® 770 is bis(2,2,6,6-tetramethylpiperidin-4-yl) sebacate.
TINUVIN ® 622 is the polycondensation product of 1-(2-hydroxyethyl)-2,2,6,6-tetra-methyl-4-hydroxypiperidine and succinic acid.
TINUVIN ® 123 is bis(1-octyloxy-2,2,6,6-tetramethylpiperidin-4-yl) sebacate.
HOSTAVIN ® N-30 is polymeric hindered amine.

Performance criteria that are measured include the rate and extent of discoloration (yellowness index and delta E) and melt stability as measured by capillary rheometry. Performance data are obtained on a 50/50 weight/weight extruded blend of PC and ABS, both natural and pigmented with titanium dioxide. Additional performance data are obtained using a commercial grade of PC/ABS, CYCOLOY® MC-8002, which is pigmented with titanium dioxide.

The optimum stabilization performance is achieved when a GOODRITE® type hindered amine (HALS) is used in conjunction with a UV absorber. When a hindered amine alone is the stabilizer, even a non-basic hindered amine to a lesser extent, greater discoloration occurs for PC/ABS plaques exposed to accelerated weathering (Xenon Arc). Useful loading levels for the hindered amine should range from 0.05% to 5%, preferably from 0.25 to 2% by weight, based on the polymer blend. Useful loading levels for a UV absorber should be from 0.05 to 5%, preferably from 0.25% to 2% by weight, based on the polymer blend.

The GOODRITE® type hindered amines of interest here are those of the general class of certain alkylated 2-piperazinone compounds, especially those multi-ring compounds which possess a triazine ring (such as GOODRITE® 3150 or GOODRITE® 3159). Other hindered amines compounds that contain a similar 3,3,5,5-tetramethyl-2-piperazinone structure are anticipated to display similar performance. See U.S. Pat. Pat. No. 4,929,653. Other hindered amines believed to be suitable are the 2-keto-1,4-diazacycloalkanes (see U.S. Pat. No. 4,190,571) and substituted piperazinediones (see U.S. Pat. Nos. 3,919,234; 3,920,659 and 3,928,330).

The following examples are meant for illustrative purposes only and are not to be construed to limit scope of the instant invention in any manner whatsoever.

Materials and Experimental Methods.

All additives are commercial materials. Titanium dioxide is DuPont Ti-PURE® R-104. Polycarbonate (PC) is LEXAN® 141–111 natural; ABS is Dow MAGNUM® 342EZ. Polymers and additives are extrusion compounded in one pass using a twin screw extruder of screw design 18 mm, co-rotating, non-intermeshing; processing temperature 240° C., with a die melt temperature 260° C. Injection molding of Izod bars (2.5"L×0.5"W×0.125"W) is done on a BOY 30 machine, barrel temperature 475–515° F., die temperature 515° F.

Accelerated weathering is performed using an Atlas Ci65A Weather-o-meter ("XAW"), operated in either "Dry XAW" mode (ASTM G26-90 method C) or interior auto ("IAXAW") (black panel temperature 89° C., light/dark cycle 3.8 hr/1.0 hr; irradiance 0.55 watt/m$^2$, inner filter-quartz, outer filter—high borate.

Yellowness Index and delta E color are performed as per ASTM D-1925, using a Chroma-Sensor CS-5 Colorimeter, operated at 10 degree, small area view, specular included.

Chip impact is performed per ASTM D4508-90 on a TMI Monitor/Impact Tester using a 30 ft-lb weight. Per ASTM D4508-90 paragraph 4.6, the impact strength results are reported as a complete break, a partial break or a non-break, with a non-break specimen exhibiting the most desired impact retention, and partial break being the next desired impact retention. Data presented are the average of ten replicate samples for each formulation.

Melt rheology is performed using a Kayeness Galaxy V capillary rheometer, equipped with a 1000 pound load cell, a die of orifice radius 0.015 inch and orifice length 1.0000 inch., operated at the stated test temperature. Samples are predried in a vacuum oven under nitrogen atmosphere to an analyzed moisture level of less than 100 ppm prior to rheology testing.

The pKa measurements of the hindered amines are obtained by non-aqueous titration. Organic reference materials with known pKa values in water, are titrated in non-aqueous media (1:1 acetonitrile:chloroform and 0.1 N perchloric acid/dioxane titrant system) to generate a non-aqueous calibration plot of half-neutralization potential (HNP) versus pKa. The "unknown" hindered amines are then titrated to determine the HNP, and extrapolated to obtain the corresponding pKa from this calibration plot.

Weight loss data for the hindered amines are obtained by thermogravimetric analysis on a DuPont model 2100 analyzer, operated at a scan rate of 5° C./min in a nitrogen atmosphere using 4-5 mg sample in aluminum pans.

The stabilizers used in the tests below are:

TINUVIN® 234 (Ciba) is 2-(2-hydroxy-3,5-di-α-cumylphenyl)-2H-benzotriazole;

TINUVIN® 770 (Ciba) is bis(2,2,6,6-tetramethylpiperidin-4-yl) sebacate;

TINUVIN® 622 (Ciba) is the polycondensation product of 1-(2-hydroxyethyl)-2,2,6,6-tetramethyl-4-hydroxypiperidine and succinic acid;

TINUVIN® 123 (Ciba) is bis(1-octyloxy-2,2,6,6-tetramethylpiperidin-4-yl) sebacate;

CHIMASSORB® 944 (Ciba) is the polycondensation product of 4,4'-hexa-methylene-bis(amino-2,2,6,6-tetramethylpiperidine) and 2,4-dichloro-6-tert-octylamino-s-triazine;

HOSTAVIN® N-30 (Hoechst) is a polymeric hindered amine derived from 4,4-(1-oxa-2,2-undecamethylene-3-aza-3-R-4-carbonyltetramethylene)-2,2,6,6-tetramethylpiperidine;

GOODRITE® 3150 (Goodrich) is 1,3,5-tris[N-cyclohexyl-N-(2,2,6,6-tetramethyl-piperazin-3-on-4-yl)amino]-s-triazine;

GOODRITE® 3159 (Goodrich) is 1,3,5-tris[N-cyclohexyl-N-(1,2,2,6,6-penta-methylpiperazin-3-on-4-yl)amino]-s-triazine;

IRGAFOS® 168 (Ciba) is tris(2,4-di-tert-butylphenyl) phosphite.

EXAMPLE 1

Dry XAW—Clear Polycarbonate/ABS

Chip impact bars are prepared and subjected to dry XAW accelerated weathering. The samples are removed at selected intervals for color measurement and then for destructive chip impact testing.

As seen in the Tables 2 and 3 below, the best color stability is achieved in formulation 19-10, a combination of GOODRITE® 3150 and TINUVIN® 234. While other formulations exhibited a low delta E color at 499 hours of elapsed exposure, those formulations exhibit a significant bleaching where over time the initial color fades and then discoloration proceeds. The bleaching effect is troublesome for industry since any change in color over time is perceived as inferior to an article which exhibits a stable color retention.

The retention of useful mechanical properties, as measured by chip impact strength, is also the best for formulation 19-10. After 499 hours of exposure, the PC/ABS blend containing GOODRITE® 3150 and TINUVIN® 234 at 0.75 and 0.25 wgt. % respectively gives the only non-break result of the series tested. Moreover a high percentage of impact strength is observed for formulation 19-10 (79.9%) compared to all other formulations.

TABLE 2

PC/ABS Discoloration, Dry XAW

| I.d. | Additives | Wgt. % | Delta E | | | | |
|---|---|---|---|---|---|---|---|
| 19-1 | Neat PC/ABS | none | 1.6 | 2.7 | 3.5 | 4.5 | 5.5 | 9.1 |
| 19-2 | Tinuvin 234 | 0.5 | 3.4 | 3.0 | 2.8 | 2.6 | 1.9 | 0.5 |
| 19-3 | Tinuvin 770 | 0.75 | 1.0 | 0.6 | 0.8 | 1.2 | 2.6 | 5.4 |
| 19-4 | Tinuvin 770/T234 | 0.75/0.50 | 4.0 | 4.0 | 4.1 | 4.1 | 3.9 | 2.5 |
| 19-5 | Tinuvin 622LD | 0.75 | 0.8 | 1.7 | 2.5 | 3.3 | 4.4 | 7.5 |
| 19-6 | Tinuvin 622LD/T234 | 0.75/0.50 | 4.3 | 3.9 | 3.7 | 3.4 | 2.8 | 0.9 |
| 19-9 | Goodrite 3150 | 0.75 | 1.1 | 0.8 | 0.7 | 0.9 | 1.0 | 4.1 |
| 19-10 | Goodrite 3150/T234 | 0.75/0.50 | 2.9 | 3.2 | 3.3 | 3.2 | 3.2 | 2.6 |
| Cumulative Exposure (Hours) | | | 50 | 100 | 151 | 197 | 307 | 499 |
| Cumulative Irradiance (KJ/M$^2$) | | | 63 | 125 | 189 | 246 | 383 | 622 |

All formulations contain 0.1% Irgafos 168; all are 50/50 wt/wt PC and ABS.

TABLE 3

Chip-Impact (ft-lbs/In) During Dry XAW Exposure

| 19- Additives | Wgt. % | NB | NB | NB | P | NB | P | NB | P | NB | P | NB | P |
|---|---|---|---|---|---|---|---|---|---|---|---|---|---|
| 1 Neat PC\ABS | none | 20.3 | 15.3 | | 9.5 | | 11.0 | | 10.1 | | 9.7 | | 8.7 |
| 2 Tinuvin 234 | 0.5 | 20.5 | 21.6 | 14.5 | | | 10.8 | | 9.3 | | 10.7 | | 10.1 |
| 3 Tinuvin 770 | 0.75 | 20.3 | 18.9 | 21.0 | | 21.0 | | 19.5 | — | | 6.5 | | 7.0 |
| 4 T-770/T234 | 0.75/0.50 | 20.0 | 20.7 | 20.9 | | 21.1 | | 21.0 | | 21.3 | | | 5.9 |
| 5 Tinuvin 622LD | 0.75 | 20.1 | 18.3 | | 8.4 | | 8.6 | | 7.9 | | 7.7 | | 7.9 |
| 6 T-622LD/T234 | 0.75/0.50 | 19.8 | 20.3 | | 9.5 | | 9.4 | | 8.1 | | 8.8 | | 7.6 |
| 9 Goodrite 3150 | 0.75 | 20.4 | 21.5 | 21.7 | | 21.7 | | 21.6 | | 21.3 | | | 7.6 |
| 10 Good 3150/T234 | 0.75/0.50 | 19.9 | 20.9 | 21.4 | | 21.6 | | 21.7 | | 21.7 | | 15.9 | |
| Cumulative Exposure (Hours) = | | 0 | 50 | 100 | | 151 | | 197 | | 307 | | 500 | |
| Cumulative Irradiance KJ/M$^2$ = | | 0 | 63 | 125 | | 189 | | 246 | | 383 | | 622 | |

All formulations, 19-1 to 19-10 contain (0.1%) Irgafos-168; all are 50/50 wt/wt PC and ABS.
Abbrev.: NB = non-break; P = partial break; per AST MD-4508.

EXAMPLE 2

Interior Auto XAW—Clear PC/ABS

Chip impact bars are prepared and subjected to accelerated weathering under interior auto Xenon Arc Weather-Ometer (IAXAW) conditions. Test samples are removed at intervals for color measurement and then destructive chip impact testing. The IAXAW conditions are more severe than dry Xenon (XAW) conditions due to higher temperature and higher irradiance energy.

As seen in Tables 4 and 5 below, the best color stability is also achieved with formulation 19-10, a combination of GOODRITE® 3150 and TINUVIN® 234. This formulation exhibits the lowest delta E color at 485 hours of elapsed exposure.

The retention of useful mechanical properties, as measured by chip impact strength, is also the best for formulations 19-10 and R42-13. After 485 hours of exposure, the PC/ABS blend containing GOODRITE® 3150 and TINUVIN® 234 at 0.75 and 0.25 wgt. % respectively or 0.5 and 0.25 wgt % respectively, gives the highest impact strength of any combination of hindered amine and TINUVIN® 234.

TABLE 4

PC/ABS Discoloration, IAXAW.

| ID | Additives | wgt. % | | | Delta E | | | |
|---|---|---|---|---|---|---|---|---|
| 19-1 | Neat PC/ABS | none | 4.2 | 7.2 | 9.1 | 10.6 | 14.6 | 18.4 |
| 19-2 | Tinuvin 234 | 0.5 | 1.9 | 0.6 | 1.1 | 2.6 | 6.2 | 10.8 |
| 19-3 | Tinuvin 770 | 0.75 | 2.4 | 5.3 | 7.0 | 8.4 | 11.6 | 15.3 |
| 19-4 | Tinuvin 770/T234 | 0.75/0.50 | 2.4 | 1.4 | 0.7 | 1.5 | 4.1 | 9.0 |
| 19-5 | Tinuvin 622LD | 0.75 | 3.7 | 6.4 | 8.0 | 9.5 | 13.1 | 17.2 |
| 19-6 | Tinuvin 622LD/T234 | 0.75/0.50 | 2.5 | 1.1 | 0.8 | 2.1 | 5.7 | 10.3 |
| R42-8 | Tinuvin 622LD/T234 | 0.5/0.25 | 1.1 | 1.4 | 3.3 | 5.7 | 8.6 | 13.2 |
| 19-9 | Goodrite 3150 | 0.75 | 2.3 | 4.5 | 5.9 | 7.7 | 10.8 | 14.5 |
| 19-10 | Goodrite 3150/T234 | 0.75/0.50 | 1.8 | 1.0 | 0.5 | 1.3 | 4.0 | 8.4 |
| R42-13 | Goodrite 3150/T234 | 0.5/.25 | 1.5 | 0.7 | 1.7 | 3.4 | 5.8 | 10.2 |
| Cumulative Exposure (Hours) | | | 50 | 97 | 147 | 193 | 306 | 485 |
| Cumulative Irradiance (KJ/M$^2$) | | | 76.0 | 151 | 227 | 300 | 474 | 754 |

All formulations contain (0.1%) Irgafos 168; all are 50/50 wt/wt PC and ABS.

TABLE 5

Chip-Impact (ft-lbs/in) During Interior Auto XAW Exposure

| 19- | Additives | Wgt. % | NB | NB | P | NB | P | NB | P | NB | P | NB | P | C |
|---|---|---|---|---|---|---|---|---|---|---|---|---|---|---|
| 1 | Neat PCABS | none | 20.3 | | 11.0 | | 10.3 | | 10.4 | | 9.4 | | 9.1 | |
| 2 | T-234 | 0.5 | 20.5 | 14.8 | 8.8 | | 11.3 | | 10.7 | | 9.6 | | 10.6 | |
| R42-2 | T-234 | 0.25 | 21.8 | 14.8 | | 13.3 | | 12.8 | | 12.1 | | | 11.5 | |
| 3 | T-770 | 0.75 | 20.3 | 19.5 | | | 7.3 | | 6.8 | | 5.1 | | | 1.7 |
| R42-5 | T-770/T234 | 0.5/.25 | 22.5 | 23.0 | | 13.7 | | 11.9 | | 11.1 | | | 8.6 | |
| 4 | T-770/T234 | 0.75/0.50 | 20.0 | 20.3 | | | 7.6 | | 6.8 | | 4.7 | | | 1.0 |
| 5 | T-622LD | 0.75 | 20.1 | | 8.1 | | 7.7 | | 8.1 | | 8.4 | | 7.3 | |
| 6 | T-622LD/T234 | 0.75/0.50 | 19.8 | | 9.9 | | 9.2 | | 7.9 | | 8.0 | | 8.8 | |
| 9 | Goodrite 3150 | 0.75 | 20.4 | 20.7 | | | 8.4 | | 8.7 | | 8.7 | | 8.1 | |
| R42-13 | Good. 3150/T234 | 0.5/.25 | 21.1 | 20.9 | | 12.3 | | 10.9 | | 11.9 | | | 10.9 | |
| 10 | Good. 3150/T234 | 0.75/0.50 | 19.9 | 20.9 | | 16.2 | | | 11.4 | | 8.5 | | 10.5 | |

TABLE 5-continued

Chip-Impact (ft-lbs/in) During Interior Auto XAW Exposure

| 19- | Additives | Wgt. % | NB | NB | P | NB | P | NB | P | NB | P | NB | P | C |
|---|---|---|---|---|---|---|---|---|---|---|---|---|---|---|
| Cumulative Exposure (Hours) | | | 0 | 50 | | 100 | | 150 | | 306 | | 485 | | |
| Cumulative Irradiance (KJ/M$^2$) | | | 0 | 76 | | 152 | | 227 | | 474 | | 754 | | |

All Formulations contain (0.1%) Irgafos 168; all are 50/50 wt/wt of PC & ABS.
Abbrev. per ASTM D-4508: NB = non-break: P = partial break; C = complete breakage.

EXAMPLE 3

Interior Auto XAW—Pigmented PC/ABS

The data presented in Tables 6 and 7 are for a 50/50 wt/wt blend of PC and ABS which contains 1.0 wt. % titanium dioxide (TiO$_2$). The combination of GOODRITE® 3150 with TINUVIN® 234 (formulation 10-9) gives the lowest change in color (delta E) compared to any other hindered amine combination with TINUVIN® 234. The chip impact values are favorably high as well. Many of the formulations exhibit good retention of chip impact strength. This may be due to the presence of titanium dioxide which is reported to be a UV stabilizer for some polymers. Although the samples are not tested 'to failure', it is clear that the samples containing TINUVIN® 770 (formulations 10-4 and 10-5) begin to lose significant impact strength after 512 hours of Xenon arc exposure.

TABLE 6

PC/ABS/TiO$_2$ Discoloration, IAXAW.

| ID | Additives | wgt. % | Delta E Color | | | | | |
|---|---|---|---|---|---|---|---|---|
| 10-1 | Neat PC/ABS no TiO$_2$ | none | 4.5 | 7.6 | 9.4 | 11.0 | 14.3 | 18.3 |
| 10-2 | Neat PC/ABS TiO$_2$ | none | 4.1 | 9.1 | 13.0 | 16.4 | 23.0 | 29.2 |
| 10-3 | Tinuvin 234 | 0.5 | 1.5 | 5.6 | 8.6 | 11.7 | 18.4 | 24.4 |
| 10-4 | Tinuvin 770 | 0.75 | 2.2 | 6.6 | 10.2 | 13.4 | 19.7 | 25.5 |
| 10-5 | Tinuvin 770/T234 | 0.75/0.50 | 1.4 | 4.0 | 6.6 | 9.5 | 15.4 | 21.7 |
| 10-6 | Tinuvin 622LD | 0.75 | 3.7 | 8.6 | 12.7 | 15.9 | 22.6 | 28.6 |
| 10-7 | Tinuvin 622LD/T234 | 0.75/0.50 | 1.5 | 5.8 | 8.6 | 11.5 | 18.6 | 24.7 |
| 10-8 | Goodrite 3150 | 0.75 | 1.9 | 5.5 | 8.4 | 11.1 | 17.1 | 23.0 |
| 10-9 | Goodrite 3150/T234 | 0.75/0.50 | 0.9 | 2.7 | 4.9 | 7.2 | 13.0 | 19.4 |
| Cumulative Exposure (Hours) | | 50 | 106 | 150 | 208 | 314 | 512 | |
| Cumulative Irradiance (KJ/M$^2$) | | 75 | 165 | 233 | 324 | 489 | 797 | |

All formulations contain (0.1%) Irgafos 168; all are 50/50 wt/wt PC and ABS.
Formul 10-2 through 10-9 contain TiC$_2$, (1.0 wt. %).

TABLE 7

PC/ABS/TiO$_2$
Chip-Impact (ft-lbs/in) After Hours of IAXAW

| i.d. | Additives | Wgt. % | NB | NB | NB | NB | NB | NB | NB |
|---|---|---|---|---|---|---|---|---|---|
| 10-1 | Neat PC/ABS, no TiO$_2$ | none | 22.6 | 13.4 | 12.1 | 12.9 | 13.5 | 12.5 | 12.3 |
| 10-2 | Neat PC/ABS TiO$_2$ | none | 24.2 | 15.4 | 15.2 | 13.9 | 15.5 | 13.5 | 12.9 |
| 10-3 | Tinuvin 234 | 0.5 | 22.7 | 14.8 | 12.3 | 13.4 | 14.5 | 12.4 | 10.1 |
| 10-4 | Tinuvin 770 | 0.75 | 23.2 | 20.4 | 12.9 | 11.9 | 12.6 | 8.9 | 7.2 |
| 10-5 | Tinuvin 770/T234 | 0.75/0.50 | 23.2 | 24.1 | 11.8 | 10.6 | 15.0 | 8.1 | 4.8 |
| 10-6 | Tinuvin 622LD | 0.75 | 22.7 | 14.8 | 13.2 | 12.9 | 15.1 | 12.9 | 13.2 |
| 10-7 | Tinuvin 622LD/T234 | 0.75/0.50 | 23.9 | 15.2 | 13.7 | 14.1 | 15.6 | 13.2 | 12.7 |
| 10-8 | Goodrite 3150 | 0.75 | 23.3 | 22.3 | 13.9 | 13.8 | 14.9 | 12.4 | 11.0 |
| 10-9 | Goodrite 3150/T234 | 0.75/0.50 | 24.3 | 22.9 | 12.9 | 13.1 | 16.7 | 13.9 | 11.1 |
| Cumulative Exposure (Hours) | | 0 | 50 | 106 | 151 | 208 | 314 | 512 | |
| Cumulative Irradiance (KJ/M$^2$) | | 0 | 75 | 165 | 233 | 324 | 489 | 797 | |

Formul 10-2 through 10-9 contain TiO$_2$, (1.0 wt. %).
All Formulations contain (0.1%) Irgafos 168: all are 50/50 wt/wt of PC & ABS.
Abbrev. per ASTM D-4508: NB = non-break.

EXAMPLE 4

Dry XAW-Pigmented CYCOLOY® PC/ABS MC-8002

The data presented in Tables 8 and 9 are for a commercial blend of PC and ABS which contains 1.0% by weight of titanium dioxide. The combination of GOODRITE® 3150 or GOODRITE® 3159 with TINUVIN® 234 (formulations 6-5, 6-6, 6-10 and 6-11) gives the lowest change in color (delta E) compared to any other hindered amine combination with TINUVIN® 234 after 928 kilojoules of irradiance exposure. The chip impact values are favorably high as well especially at extended duration of irradiance exposure. Only the formulation containing GOODRITE® 3150 or GOODRITE® 3159 with TINUVIN® 234 exhibit essentially 100% impact retention at 619 and 929 kilojoules of irradiance exposure. Low retention of impact strength is observed for combination of TINUVIN® 234 with both convention hindered amines (TINUVIN® 770 or CHIMASSORB® 944) as well as with a low basicity hindered amine (HOSTAVIN® N-30) in formulations 6-7 and 6-12. It is apparent that not all low basicity hindered amines are suitable either as effective light stabilizers or as for providing high retention of impact properties which GOODRITE® 3150 and 3159 provide unique efficacies for these properties.

processing into useful articles. As stated above hindered amines which are basic (having a pKa value >7 typically) are known to cause degradation of polycarbonates, especially during melt processing of the polymer as taught by G. L. Gaines, Jr. [Polymer Degradation and Stability, 27 13-18 (1990)]. Melt rheology testing is an accepted method to assess the stability of a polymer in the melt state (see ASTM D 3835-90) and thus to relate the interaction of additives to changes in molecular weight of the polymers. Polymer

TABLE 8

Cycoloy ® MC-8002 PC/ABS Discoloration Dry XAW

| ID | Additives | wgt. % | Irradiance KJ/M$^2$ 121 | 247 | 371 Delta E | 619 | 928 |
|---|---|---|---|---|---|---|---|
| 6-1 | Neat Cycoloy MC-8002 | 0 | 1.7 | 1.8 | 1.5 | 3.6 | 6.2 |
| 6-2 | Cycoloy + TiO$_2$ | 1.0 | 2.1 | 2.9 | 3.2 | 5.1 | 8.8 |
| 6-3 | T-234 + TiO$_2$ | 0.50/1.0 | 3.6 | 2.7 | 4.1 | 3.5 | 6.6 |
| 6-4 | T-234 + TiO$_2$ + T-770 | 0.50/1.0/0.25 | 3.3 | 2.3 | 3.7 | 3.1 | 6.8 |
| 6-5 | T-234 + TiO$_2$ + G-3150 | 0.50/1.0/0.25 | 4.7 | 3.2 | 5.3 | 3.8 | 4.1 |
| 6-6 | T-234 + TiO$_2$ + G-3159 | 0.50/1.0/0.25 | 5.1 | 3.8 | 5.7 | 4.4 | 4.7 |
| 6-7 | T-234 + TiO$_2$ + N30 | 0.50/1.0/0.25 | 3.5 | 2.3 | 3.8 | 2.8 | 6.2 |
| 6-8 | T-234 + TiO$_2$ + CH-944 | 0.50/1.0/0.25 | 4.8 | 2.7 | 4.9 | 3.8 | 5.8 |
| 6-9 | T-234 + TiO$_2$ + T-770 | 0.50/1.0/0.75 | 4.7 | 3.1 | 5.3 | 3.6 | 5.4 |
| 6-10 | T-234 + TiO$_2$ + G-3150 | 0.50/1.0/0.75 | 8.3 | 7.4 | 8.7 | 7.3 | 5.1 |
| 6-11 | T-234 + TiO$_2$ + G-3159 | 0.50/1.0/0.75 | 7.1 | 6.4 | 7.6 | 6.4 | 4.6 |
| 6-12 | T-234 + TiO$_2$ + N30 | 0.50/1.0/0.75 | 4.6 | 2.7 | 4.8 | 3.1 | 4.9 |

TABLE 9

Cycoloy ® MC-8002 PC/ABS Chip-Impact (ft-lb/in) After Dry XAW Exposure

| ID | Additives | wgt. % | Irradiance KJ/M$^2$ 0 | 121 | | 247 | | 371 | | 619 | | 929 | | |
|---|---|---|---|---|---|---|---|---|---|---|---|---|---|---|
| | | | NB | NB | C | NB | C | NB | C | NB | C | NB | P | C |
| 6-1 | Neat Cycoloy MC-8002 | 0 | 20.5 | 20.2 | | 19.4 | | 14.1 | | 17.9 | | 17.5 | | |
| 6-2 | Cycoloy + TiO$_2$ | 1.0 | 20.3 | 21.0 | | 21.0 | | 19.3 | | 13.0 | | 12.1 | | |
| 6-3 | T-234 + TiO$_2$ | 0.50/1.0 | 20.6 | 20.8 | | 21.1 | | 20.8 | | 12.4 | | 13.0 | | |
| 6-4 | T-234 + TiO$_2$ + T-770 | 0.50/1.0/0.25 | 20.6 | 20.6 | | 21.0 | | 20.6 | | 12.0 | | 11.1 | | |
| 6-5 | T-234 + TiO$_2$ + G-3150 | 0.50/1.0/0.25 | 20.1 | 20.8 | | 20.8 | | 20.5 | | 20.4 | | 20.6 | | |
| 6-6 | T-234 + TiO$_2$ + G-3159 | 0.50/1.0/0.25 | 20.1 | 21.0 | | 20.8 | | 20.6 | | 20.8 | | 20.4 | | |
| 6-7 | T-234 + TiO$_2$ + N30 | 0.50/1.0/0.25 | 20.3 | 20.9 | | 20.6 | | 20.7 | | 11.0 | | | 10.2 | |
| 6-8 | T-234 + TiO$_2$ + CH-944 | 0.50/1.0/0.25 | 20.8 | 20.9 | | 21.0 | | 20.9 | | 13.3 | | 12.2 | | |
| 6-9 | T-234 + TiO$_2$ + T-770 | 0.50/1.0/0.75 | 20.5 | 21.0 | | 21.1 | | 20.7 | | 13.6 | | 12.0 | | |
| 6-10 | T-234 + TiO$_2$ + G-3150 | 0.50/1.0/0.75 | 20.5 | 21.3 | | 21.1 | | 20.9 | | 20.9 | | 20.7 | | |
| 6-11 | T-234 + TiO$_2$ + G-3159 | 0.50/1.0/0.75 | 20.4 | 20.9 | | 21.2 | | 20.7 | | 20.7 | | 20.8 | | |
| 6-12 | T-234 + TiO$_2$ + N30 | 0.50/1.0/0.75 | 20.5 | 20.8 | | 21.0 | | 20.6 | | 11.3 | | | 9.7 | |

EXAMPLE 5

Melt Stability of PC/ABS Blends

The retention of molecular weight during processing of a polymer or polymer blend is critical for the successful production of a useful article. Additives which interact adversely with the polymer substrate during processing are of limited or no value to the production of a final useful article. The adverse interactions may be due to various factors, such as a chemical reaction between the additive and the polymer which results in a reduction of polymer molecular weight by chain cleavage. Also, if the additive itself degrades during the required high temperature processing of the polymer, then the degradation products of the additive itself may interact antagonistically with the polymer.

An acceptable hindered amine stabilizer for use in a polycarbonate blend should exhibit minimal deleterious interaction with the polymers during their high temperature processing into useful articles. As stated above hindered molecular weight, and changes in molecular weight, may be expressed in terms of the polymer apparent melt viscosity. A decrease in apparent melt viscosity over time of the test indicates that polymer degradation and molecular weight reduction are occurring whereas an increase in apparent melt viscosity over time indicates polymer degradation may be occurring by a crosslinking or a molecular weight buildup mechanism. It is often convenient to represent this change in melt viscosity as the melt viscosity ratio as taught by A. B. Auerbach et al., Polymer Engineering and Science, 30, 1041–1050 (1990). The melt viscosity ratio (MVR) may be defined as the change in melt viscosity ($\eta$) over time, and expressed as the ratio of a melt viscosity at some extended test time ($\eta_x$), divided by the initial melt viscosity ($\eta_o$) ultimately expressed as ($x/\eta_o$).

Unexpectedly, GOODRITE® type hindered amines (especially GOODRITE® 3150) exhibit the least detrimental impact on apparent melt viscosity of the hindered amine stabilizers tested. Results in Table 10 depict the melt viscosity ratio at 10 minutes and 15 minutes of test time for a 50/50 wt/wt PC/ABS sample and polymer samples containing various additives which were incorporated as described for Examples 1 and 2. These data indicate that the least change in apparent melt viscosity after 10 minutes and 15 minutes of rheometer occurs for sample 19-9 (GOODRITE® 3150 at 0.75%) and sample 19-10 [combination of GOODRITE® 3150 (0.75%) and TINUVIN® 234 UV absorber (0.50%)].

Comparing the PC/ABS containing the combination of UV absorber with a hindered amine, the sample 19-10 containing TINUVIN® 234/GOODRITE® 3150 exhibit the least reduction in melt viscosity than any other hindered amine/UV absorber combination. Also, sample 19-10 exhibit a lower reduction in melt viscosity than even the unstabilized PC/ABS (sample 19-1).

Comparing the PC/ABS containing only a hindered amine, the sample containing GOODRITE® 3150 exhibits the least reduction in melt viscosity, even improved over the unstabilized PC/ABS (sample 19-1). The sample containing GOODRITE® 3150 also exhibits a more favorably lower reduction in melt viscosity than a sample containing TINUVIN® 622, a hindered amine which has a nearly equivalent pKa value as the GOODRITE® 3150. Thus, not all hindered amines of similar pKa values exhibit the same influence on melt stability of PC/ABS blends. This is a novel finding and stands in contrast to a prior art teaching that non-interacting hindered amines are equivalent in their effect on chain scission of polycarbonate.

TABLE 10

Isothermal Melt Degradation Ratios at Constant Shear Rate 280° C. & 100 sec$^{-1}$

| i.d.19- | Additives | Wgt. % | $\eta10/\eta5$ | $\eta15/\eta5$ |
|---|---|---|---|---|
| 1 | Neat PC/ABS | none | −7.5 | −13.9 |
| 2 | Tinuvin 234 | 0.5 | −7.7 | −14.0 |
| 3 | Tinuvin 770 | 0.75 | −6.3 | −12.2 |
| 4 | T-770/T234 | 0.75/0.50 | −7.8 | −14.7 |
| 5 | Tinuvin 622LD | 0.75 | −8.9 | −16.2 |
| 6 | T-622LD/T234 | 0.75/0.50 | −8.0 | −14.7 |
| 9 | Goodrite 3150 | 0.75 | −4.7 | −9.2 |
| 10 | Good.3150/T234 | 0.75/0.50 | −4.9 | −9.6 |

EXAMPLE 6

Dry XAW—Clear Polycarbonate/ABS

This polymer blend is prepared by two-step compounding. The hindered amine is extrusion compounded with ABS on a 18 mm twin screw extruder with set temperatures (throat to die, ° C.) of 170/200/215/225/225/225. The ABS is optionally redried then extrusion compounded with an equal weight of polycarbonate to achieve a 50/50 wt/wt ratio blend. TINUVIN® 234 is added during the second extrusion compounding step although the UV absorber can also be added during the first compounding step.

Thereafter, chip impact bars are prepared and subjected to dry XAW accelerated weathering. The samples are removed at selected intervals for color measurement and then for destructive chip impact testing.

As seen on Tables 11 and 12 below, reasonably equivalent color stability is achieved for both TINUVIN® 234 and GOODRITE® 3150. However, as is seen in Example 1, best retention of impact strength is achieved in formula 28-7 which is a combination of TINUVIN® 234 and GOODRITE® 3150. At 390 hours only the highest loading of GOODRITE® 3150 at 0.75 wt % gives significantly highest retention of impact strength (see formulation 28-7).

TABLE 11

PC/ABS Discoloration. Dry XAW, Two Pass Extrusion Compounding.

| ID | Additives | wgt. % | 100 | 200 | Delta E 300 | 390 | 500 | 750 |
|---|---|---|---|---|---|---|---|---|
| 28-1 | Neat PC/ABS 50/50 wt/wt | none | 2.0 | 3.4 | 5.4 | 5.4 | 8.0 | 12.2 |
| 28-2 | T-234 | 0.50 | 3.4 | 2.4 | 1.7 | 1.7 | 2.1 | 4.5 |
| 28-3 | T-234 | 1.00 | 4.0 | 3.8 | 3.6 | 3.6 | 1.7 | 2.3 |
| 28-4 | Tinuvin 770 & T234 | 0.75/0.50 | 3.8 | 3.8 | 3.7 | 3.7 | 2.2 | 2.0 |
| 28-5 | Tinuvin 770 & T234 | 0.25/0.50 | 4.0 | 3.6 | 3.1 | 3.1 | 1.2 | 2.8 |
| 28-6 | Tinuvin 770 & T234 | 0.375/0.50 | 4.0 | 4.0 | 3.3 | 3.3 | 1.4 | 2.2 |
| 28-7 | Goodrite 3150 & T234 | 0.75/0.50 | 4.6 | 4.7 | 4.5 | 4.5 | 3.8 | 3.1 |
| 28-8 | Goodrite 3150 & 2T34 | 0.25/0.50 | 3.9 | 4.2 | 3.8 | 3.8 | 3.2 | 2.5 |

TABLE 12

Chip Impact (ft-lbs/in) During Dry XAW. Two-Pass Extrusion Compounding.

| | | | HOURS | | | | | |
|---|---|---|---|---|---|---|---|---|
| ID | Additives | Hours = wgt. % | 0 NB | 100 NB | 200 NB | P | 390 NB | P | 500 P | 750 NB |
| 28-1 | Neat PC\ABS | none | 20.2 | 10.8 | 9.1 | | 10.0 | 9.5 | 10.6 |
| 28-2 | T-234 | 0.50 | 20.3 | 12.6 | 10.4 | | 8.8 | 11.0 | 8.9 |
| 28-3 | T-234 | 1.00 | 20.3 | 20.5 | 11.0 | | 10.3 | 10.3 | 9.4 |

TABLE 12-continued

Chip Impact (ft-lbs/in) During Dry XAW.
Two-Pass Extrusion Compounding.

| ID | Additives | Hours = wgt. % | 0 NB | 100 NB | 200 NB | 200 P | 390 NB | 390 P | 500 P | 750 NB |
|---|---|---|---|---|---|---|---|---|---|---|
| 28-4 | Tinuvin 770 & T234 | 0.75/0.50 | 20.2 | 21.9 | 22.3 | | | 13.2 | 8.2 | 8.6 |
| 28-5 | Tinuvin 770 & T234 | 0.25/0.50 | 20.6 | 22.0 | | 10.6 | | 8.7 | 9.5 | 8.5 |
| 28-6 | Tinuvin 770 & T234 | 9.375/0.50 | 20.5 | 22.0 | | 11.8 | | 8.5 | 8.9 | 9.4 |
| 28-7 | Goodrite 3150 & T234 | 0.75/0.50 | 20.3 | 22.3 | 22.3 | | 20.0 | | 8.6 | 8.6 |
| 28-8 | Goodrite 3150 & T234 | 0.25/0.50 | 20.7 | 22.0 | 22.4 | | | 12.0 | 11.3 | 10.1 |
| | Irradiance KJ/M$^2$ = | | 0 | 123 | 247 | | 483 | | 619 | 929 |

EXAMPLE 7

Dry XAW—Pigmented CYCOLOY® PC/ABS MC-8002

The data presented in Tables 13 and 14 are for a 50/50 wt/wt blend of LEXAN® 141 PC and MAGNUM® 342 ABS, which contains 1% by weight of titanium dioxide. Compounding is performed in a fashion similar to the method described under Materials and Experimental Methods. The combination of GOODRITE® 3150 or GOODRITE® 3159 with either TINUVIN® 1577 or TINUVIN® 234 (formulations 25-5B, 25-C, 25-8B or 25-5C) gives the greatest retention in impact strength compared to the combination of TINUVIN® 770 with either TINUVIN® 1577 or TINUVIN® 234 after 612 and especially after 919 kilojoules of irradiance exposure. While reasonably similar color is observed for many of these formulations, it is clear that an antagonism exists between the polymer blend and the TINUVIN® 770-containing formulations which results in low impact strength retention.

TABLE 13

Comparison of UV Absorbers - Benzotriazole and Triazinic
Chip-Impact (ft-lbs/in) During Dry XAW exposure

| XAW Irradiance (KJ/M$^2$) = | | | 0 | 244 | | 366 | | 489 | | 612 | | 919 | |
|---|---|---|---|---|---|---|---|---|---|---|---|---|---|
| XAW Hours = | | | 0 | 200 | | 300 | | 400 | | 500 | | 750 | |
| ID | Additives | wgt. % | NB | NB | P | NB | P | NB | C | NB | C | P | C |
| 25-1B | Neat Cycoloy | 0.00 | 20.8 | | 9.5 | | 9.7 | | 9.8 | | 9.5 | | 9.7 |
| 25-2B | G 3150 | 0.50 | 20.8 | 21.1 | | | 7.7 | | 8.4 | | 8.4 | | 8.0 |
| 25-4B | Tin 1577 | 0.50 | 20.9 | | 10.1 | | 8.8 | | 8.2 | | 8.4 | | 9.7 |
| 25-7B | Tin 1577 | 1.00 | 20.7 | 17.8 | | | 10.4 | | 10.0 | | 9.7 | | 9.0 |
| 25-1C | Tin 234 | 0.50 | 21.0 | | 10.9 | | 9.8 | | 9.1 | | 9.3 | | 9.3 |
| 25-4C | Tin 234 | 1.00 | 21.1 | 19.2 | | | 10.8 | | 10.1 | | 10.2 | | 9.5 |
| 25-5B | Tin 1577 + G 3150 | 0.50/0.50 | 21.0 | 21.1 | | 21.5 | | 20.4 | | 13.1 | | | 9.4 |
| 25-2C | Tin 234 + G 3150 | 0.50/0.50 | 21.1 | 21.4 | | 21.6 | | 21.0 | | | 11.1 | | 9.4 |
| 25-8B | Tin 1577 + G 3150 | 1.00/0.50 | 21.3 | 21.4 | | 21.5 | | 21.2 | | 21.6 | | 13.6 | |
| 25-5C | Tin 234 + G 3150 | 1.00/0.50 | 20.8 | 21.2 | | 21.6 | | 21.4 | | 19.5 | | | 10.0 |
| 25-1D | Tin 1577 + Tin 770 | 1.00/0.50 | 20.9 | 21.0 | | 21.3 | | 21.2 | | 17.1 | | | 9.6 |
| 25-8D | Tin 234 + Tin 770 | 1.00/0.50 | 21.7 | 21.7 | | 22.1 | | 21.0 | | | 13.1 | | 10.0 |

TABLE 14

PC/ABS Discoloration Dry XAW

| | Irradiance KJ/M$^2$ = | | 243.9 | 365.7 | 488.7 | 612.1 | 919.1 | 1104.3 | 1581.3 | 1857.7 |
|---|---|---|---|---|---|---|---|---|---|---|
| | XAW Hours = | | 199.7 | 300.0 | 399.3 | 499.3 | 749.7 | 899.6 | 1200.2 | 1500.0 |
| ID | Additives | wgt. % | | | | | | | | |
| 25-1B | Neat Cycoloy | 0.00 | 4.2 | 5.7 | 6.0 | 7.1 | 8.3 | 11.2 | 14.5 | 18.6 |
| 25-2B | G 3150 | 0.50 | 2.6 | 3.9 | 4.3 | 4.5 | 5.5 | 6.8 | 8.8 | 11.4 |
| 25-4B | Tin 1577 | 0.50 | 4.0 | 3.5 | 4.6 | 4.3 | 4.0 | 2.9 | 2.8 | 4.9 |
| 25-7B | Tin 1577 | 1.00 | 4.6 | 4.2 | 5.4 | 5.3 | 5.2 | 4.5 | 3.8 | 2.9 |
| 25-1C | Tin 234 | 0.50 | 4.0 | 3.3 | 4.0 | 3.5 | 2.8 | 2.0 | 3.6 | 7.5 |
| 25-4C | Tin 234 | 1.00 | 4.2 | 3.9 | 4.8 | 4.6 | 4.1 | 3.1 | 2.0 | 2.4 |
| 25-5B | Tin 1577 + G 3150 | 0.50/0.50 | 6.0 | 5.7 | 6.7 | 6.5 | 6.0 | 5.2 | 4.5 | 2.8 |
| 25-2C | Tin 234 + G 3150 | 0.50/0.50 | 6.5 | 6.2 | 7.1 | 6.8 | 6.3 | 5.6 | 4.9 | 2.7 |
| 25-8B | Tin 1577 + G 3150 | 1.00/0.50 | 4.7 | 4.4 | 5.5 | 5.5 | 5.3 | 4.9 | 4.7 | 3.6 |
| 25-5C | Tin 234 + G 3150 | 1.00/0.50 | 5.9 | 5.6 | 6.6 | 6.4 | 6.0 | 5.5 | 4.8 | 2.8 |

TABLE 14-continued

PC/ABS Discoloration Dry XAW

| | | | | | | | | | | |
|---|---|---|---|---|---|---|---|---|---|---|
| Irradiance KJ/M$^2$ = | | | 243.9 | 365.7 | 488.7 | 612.1 | 919.1 | 1104.3 | 1581.3 | 1857.7 |
| XAW Hours = | | | 199.7 | 300.0 | 399.3 | 499.3 | 749.7 | 899.6 | 1200.2 | 1500.0 |
| ID | Additives | wgt. % | | | | | | | | |
| 25-1D | Tin 1577 + Tin 770 | 1.00/0.50 | 4.7 | 4.4 | 5.6 | 5.3 | 5.2 | 4.7 | 4.1 | 2.7 |
| 25-8D | Tin 234 + Tin 770 | 1.00/0.50 | 5.2 | 4.6 | 5.7 | 5.3 | 5.0 | 4.4 | 3.4 | 2.5 |

What is claimed is:

1. A composition stabilized against the adverse effects of heat and light which comprises
    (a) a blend of polycarbonate and a second polymer selected from the group consisting of the polyesters, styrenic copolymers, rubbers and vinyl chloride polymers or copolymers; and
    (b) an effective stabilizing amount of a mixture of a non-basic hindered amine which is
        1,3,5-tris{N-cyclohexyl-N-[2-(3,3,5,5-tetramethylpiperazin-2-on-1-yl)ethyl]amino}-s-triazine; or
        1,3,5-tris{N-cyclohexyl-N-[2-(3,3,4,5,5-pentamethylpiperazin-2-on-1-yl)ethyl]amino}-s-triazine; and
        a UV absorber selected from the group consisting of a benzotriazole, an O-hydroxyphenyl-s-triazine or a benzophenone.

2. A composition according to claim 1 wherein the second polymer is selected from the group consisting acrylonitrile-butadiene-stryene (ABS resin), acrylonitrile-styrene-acrylate (ASA resin), acrylonitrile-EPDM-styrene (AES resin), styrene-acrylonitrile (SAN resin), poly(ethylene terephthalate), poly(butylene terephthalate), methyl methacrylate-butadiene-styrene (MBS resin), acrylic rubber, nitrile rubber, polybutadiene, polyisoprene, poly(vinyl chloride) and ABS resin; and poly(vinyl chloride) and ASA resin.

3. A composition according to claim 2 wherein the second polymer is ABS resin.

4. A composition according to claim 1 which is also pigmented.

5. A composition according to claim 1 wherein the effective stabilizing mixture is 0.05 to 5% by weight of a hindered amine and 0.05 to 5% by weight of a UV absorber, each based on the weight of polymer blend.

6. A composition according to claim 5 wherein the effective stabilizing mixture from 0.25 to 2% by weight of a hindered amine and from 0.25% to 2% by weight of a UV absorber, each based on the weight of the polymer blend.

7. A composition according to claim 1 wherein the UV absorber is 2-(2-hydroxy-3,5-di-α-cumylphenyl)-2H-benzotriazole;

2-(2-hydroxy-5-tert-octylphenyl)-2H-benzotriazole;

2-(2-hydroxy-3-α-cumyl-5-tert-octylphenyl)-2H-benzotriazole; or 2,4-diphenyl-6-(2-hydroxy-4-hexyloxyphenyl)-s-triazine.

* * * * *